United States Patent [19]

Kobayashi

[11] Patent Number: 5,760,549

[45] Date of Patent: Jun. 2, 1998

[54] PARABOLIC-WAVE SHAPING CIRCUIT FOR FOCUS-CORRECTION

[75] Inventor: Masaki Kobayashi, Nagasaki, Japan

[73] Assignee: Mitsubishi Denki Kabushiki Kaisha, Tokyo, Japan

[21] Appl. No.: 845,042

[22] Filed: Apr. 21, 1997

Related U.S. Application Data

[62] Division of Ser. No. 505,387, Jul. 21, 1995, Pat. No. 5,663,617.

[30] Foreign Application Priority Data

Mar. 7, 1995 [JP] Japan .................................. 7-047183

[51] Int. Cl.$^6$ ...................................................... G09G 1/04
[52] U.S. Cl. ........................................................ 315/382
[58] Field of Search ............................ 315/382, 382.1, 315/395; 348/806

[56] References Cited

U.S. PATENT DOCUMENTS 4,683,405  7/1987  Truskalo et al. ....................... 315/382

FOREIGN PATENT DOCUMENTS 62-283779  12/1987  Japan .
1-105264    7/1989  Japan .

Primary Examiner—Gregory C. Issing
Attorney, Agent, or Firm—Burns, Doane, Swecker & Mathis, LLP

[57] ABSTRACT

A focus correcting circuit for a CRT including a parabolic wave outputting circuit for outputting a combined signal of a vertical parabolic wave and a horizontal parabolic wave as an output wave, and a parabolic wave shaping circuit for clipping the output wave making it possible to lower the power supply voltage necessary for outputting the parabolic waveforms. The parabolic wave shaping circuit includes one or more holding circuits for receiving a blanking pulse used to clip a portion of the output wave corresponding to a flyback period of the CRT.

6 Claims, 12 Drawing Sheets

PARABOLIC-WAVE SHAPING CIRCUIT FOR FOCUS-CORRECTION

This application is a divisional of application Ser. No. 08/505,387, filed Jul. 21, 1995 now U.S. Pat. No. 5,663,617.

BACKGROUND OF THE INVENTION

1. Field of the Invention

This invention relates to the improvement of a focus-correcting circuit of a display unit using a cathode-ray tube (hereinafter referred to as CRT) used as a CRT display monitor, a television display, and so forth.

2. Description of the Prior Art

Focus-correction signals having the waveforms of so-called parabolic waveforms and periods equal to vertical and horizontal scanning periods, are conventionally used for equalizing the focusing degrees on the periphery and in the center of the surface of a CRT.

FIG. 10 is a circuit diagram showing a conventional focus-correcting circuit for a CRT disclosed in, for example, Published Unexamined Utility Model Application of 105264/89 (Jikkai-Hei 1-105264). In the figure, reference numeral 51 denotes an input terminal, and numeral 52 denotes an output terminal.

The operation of the circuit will be described with reference to accompanying drawings in the following. When a sawtooth wave signal 4 for deflection shown in FIG. 11(a) is input on the input terminal 51 of the circuit of FIG. 10, a signal having a waveform 6 of FIG. 11(b) is obtained on the output terminal 52 of the circuit as a dynamic focusing signal if the amplitude of the sawtooth wave signal 4 is small, and a signal having a waveform 7 of the figure is obtained if the amplitude of the signal 4 is large.

The output voltage of the circuit begins to fall when the AC amplitude of the input signal becomes larger than a certain value, and the diode D1 turns on when the output voltage becomes (Vl–Vf) at the point A of time of FIG. 11(b) (where reference letter Vl denotes the DC bias voltage at the input terminal of the integrating circuit of FIG. 10, and letter Vf denotes the forward drop voltage of the diode D1). Consequently, the integrated circuit IC1 operates as only a voltage follower to output the voltage of (Vl–Vf). That is to say, while the voltage of the output signal is to be lower than (Vl–Vf), the diode D1 turns on to output a constant voltage (Vl–Vf) from the circuit. Then, When the voltage of the output signal begins to rise at the point B of time of FIG. 11(b), the diode D1 immediately turns off, and the integrated circuit IC1 operates as an integrating circuit.

The value of the minimum voltage on the output terminal 52 thus fixed at about (Vl–Vf) owing to the effect of the diode D1 and the capacitor C2 for integration, and thereby a dynamic focusing signal having a waveform whose Peaks is clipped by an amount necessary for clamping operation during fly-back line periods can be obtained.

Since the waste waveforms designated by reference numeral 3 in FIG. 11(b), which are to be output during fly-back line periods originally are not output but clipped by constructing the circuit as described above, the circuits after the next step can be constructed by using the amplifiers having dynamic ranges smaller than those which are to receive dynamic focusing signals having waveforms not clipped.

The clipping level is determined so that the interval of clipping time is completely shorter than the fly-back line period shown in FIG. 11(a). Therefore, there are no problems as far as the CRT to which the circuit is applied is used to be connected to a specified personal computer or the like which has a fixed format, but if the CRT is used to be connected to an apparatus having the format of so-called multiple scanning or automatic tracking where horizontal scanning frequencies vary widely, as shown in FIG. 12(a) and FIG. 12(b), the clipping level cannot help being determined by being adjusted to the shortest fly-back line period shown in FIG. 12(a).

If the CRT the focus-correcting circuit of which has the clipping level thus determined is used to the apparatus having a longer fly-back line period or a longer time interval as shown in FIG. 12(b), the interval of clipping time is short to increase waste outputs, which decreases the effect of clipping. Because vertical parabolic-waveforms have a fly-back line time much shorter than the scanning time, the aforementioned problem hardly matter.

Since the conventional focus-correcting circuit is constructed as described above, the circuit used in a monitor which can be applied to various personal computers having different horizontal scanning frequencies (or an automatic tracking monitor) is designed to be fitted for the apparatus having the shortest fly-back line period. Therefore, the circuit has a problem that, if the monitor is applied to a computer having longer fly-back line period, a waste amplitude is generated to make it impossible to obtain the expected effect.

The conventional circuit has another problem that the adjustment of the clipping level is not easy, because the clipping is not adjusted to timing, which is desirable, but to levels.

SUMMARY OF THE INVENTION

In view of the foregoing, it is an object of the present invention to provide a parabolic-wave shaping circuit for focus-correction which has a means for changing the clipping level of parabolic-waveforms in accordance with the blanking times of video signals not for supplying needless voltage amplitudes to a CRT if it is applied to apparatus having various fly-back line periods.

It is another object of the present invention to provide a parabolic-wave shaping circuit for focus-correction which does not output parabolic-waves only the periods necessary for focus-correction for making it possible to be adjusted accurately and quickly in a factory.

It is a further object of the present invention to provide a parabolic-wave shaping circuit for focus-correction which can keep influence on static focusing electrodes little.

It is a further object of the present invention to provide a parabolic-wave shaping circuit for focus-correction which outputs parabolic-waveforms small in amplitude for making it possible to lower the power supply voltage necessary for outputting the parabolic-waveforms.

According to the first aspect of the present invention, for achieving the above-mentioned objects, there is provided a parabolic-wave shaping circuit for focus-correction which has a clipping level manually adjusting means for adjusting the clipping levels of parabolic-waveforms manually.

As stated above, in the parabolic-wave shaping circuit for focus-correction according to the first aspect of the present invention, the clipping level manually adjusting means can clip parabolic-waveforms for arbitrary period other than the time when video signals are displayed by means of the clipping circuit thereof.

According to the second aspect of the present invention, there is provided a parabolic-wave shaping circuit for focus-correction which uses an adjustable resistor having graduations of horizontal scanning frequencies or horizontal scanning periods.

As stated above, the parabolic-wave shaping circuit for focus-correction according to the second aspect of the present invention makes it easy to adjust the levels at which parabolic waveforms are clipped by means of the adjustable resistor having graduations of horizontal scanning frequencies or horizontal scanning periods.

According to the third aspect of the present invention, there is provided a parabolic-wave shaping circuit for focus-correction which has a clipping level automatically adjusting means including a D/A converter and a central processing unit (hereinafter referred to as CPU).

As stated above, in the parabolic-wave shaping circuit for focus-correction according to the third aspect of the present invention, the clipping level automatically adjusting means can automate the adjustment of clipping levels to the optimum level by using the D/A converter and the CPU.

According to the fourth aspect of the present invention, there is provided a parabolic-wave shaping circuit for focus-correction which has a holding circuit for holding parabolic-waveforms while a blanking pulse is being output.

As stated above, in the parabolic-wave shaping circuit for focus-correction according to the fourth aspect of the present invention, the holding circuit holds parabolic-waveforms at their level at the point of time just when a blanking pulse is output, and consequently the extra adjustments of levels are not needed.

According to the fifth aspect of the present invention, there is provided a parabolic-wave shaping circuit for focus-correction which has a holding circuit including a delay circuit.

As stated above, in the parabolic-wave shaping circuit for focus-correction according to the fifth aspect of the present invention, the delay circuit in the holding circuit holds parabolic-waveforms at the level at the point of time prior to the time when a blanking pulse is output, and consequently, the more stable operation of the circuit can be obtained.

According to the sixth aspect of the present invention, there is provided a parabolic-wave shaping circuit for focus-correction which has a means for holding parabolic-waveforms at the level at the point of time when a blanking pulse ends until the time after that.

As stated above, the parabolic-wave shaping circuit for focus-correction according to the sixth aspect of the present invention can keep the holding state after the time when a blanking pulse ends, and consequently, the more stable operation of the circuit can be obtained.

BRIEF DESCRIPTION OF THE DRAWINGS

The above and further objects and novel features of the present invention will more fully appear from the following detailed description when the same is read in connection with the accompanying drawings. It is to be expressly understood, however, that the drawings are for purpose of illustration only and are not intended as a definition of the limits of the invention.

DETAILED DESCRIPTION OF THE PREFERRED EMBODIMENTS

Figure 1:
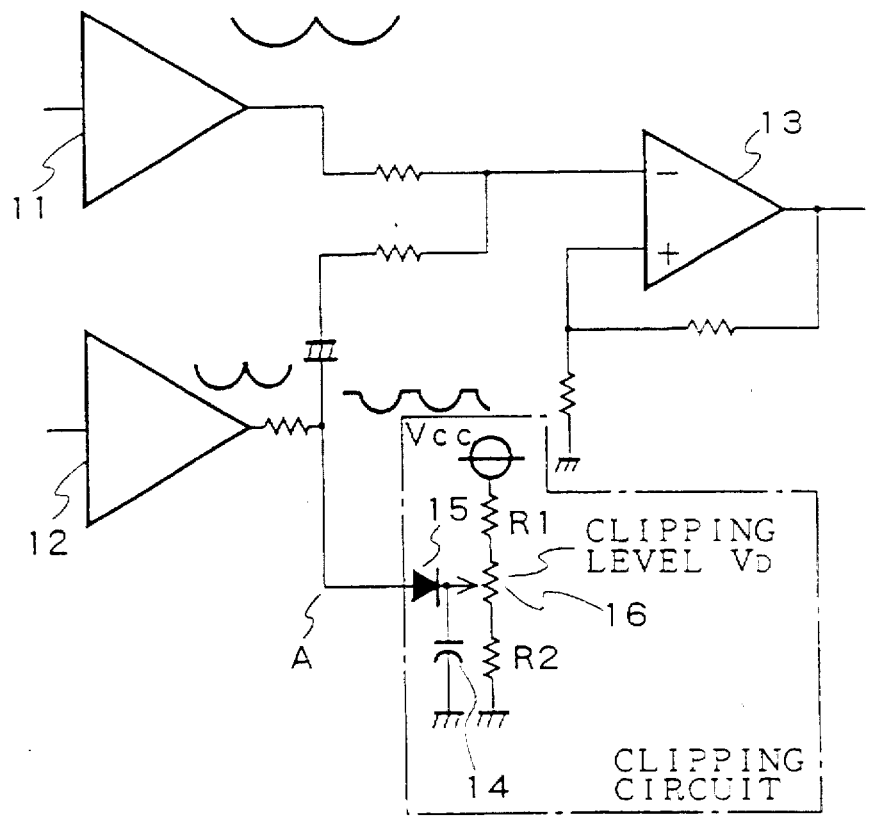
FIG. 1(a) is a circuit diagram showing the parabolic-wave shaping circuit for focus-correction of a first embodiment of the present invention (embodiment 1)
FIG. 1(b) is a front view of the variable resistor of FIG. 1(a)
Figure 1:
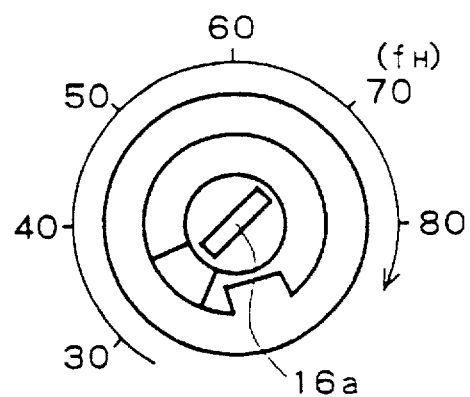

Preferred embodiments of the present invention will be described in detail in the following with reference to the accompanying drawings. The same elements of the embodiments to be described hereinafter will be denoted with the same reference numerals or reference letters, and the duplicated descriptions of them will be omitted.

EMBODIMENT 1

FIG. 1(a) is a circuit diagram showing the construction of the embodiment 1. In FIG. 1(a), reference numeral 11 denotes an amplifier for outputting a parabolic-wave having a vertical scanning period; numeral 12 denotes an amplifier for outputting a parabolic-wave having a horizontal scanning period; numeral 13 denotes an operational amplifier for adding the parabolic-waves having a vertical scanning period and a horizontal scanning period respectively; numeral 14 denotes a capacitor for reducing high frequency impedance: and numeral 15 denotes a diode connected between the output terminal of the amplifier 12 and the capacitor 14.

Figure 3:
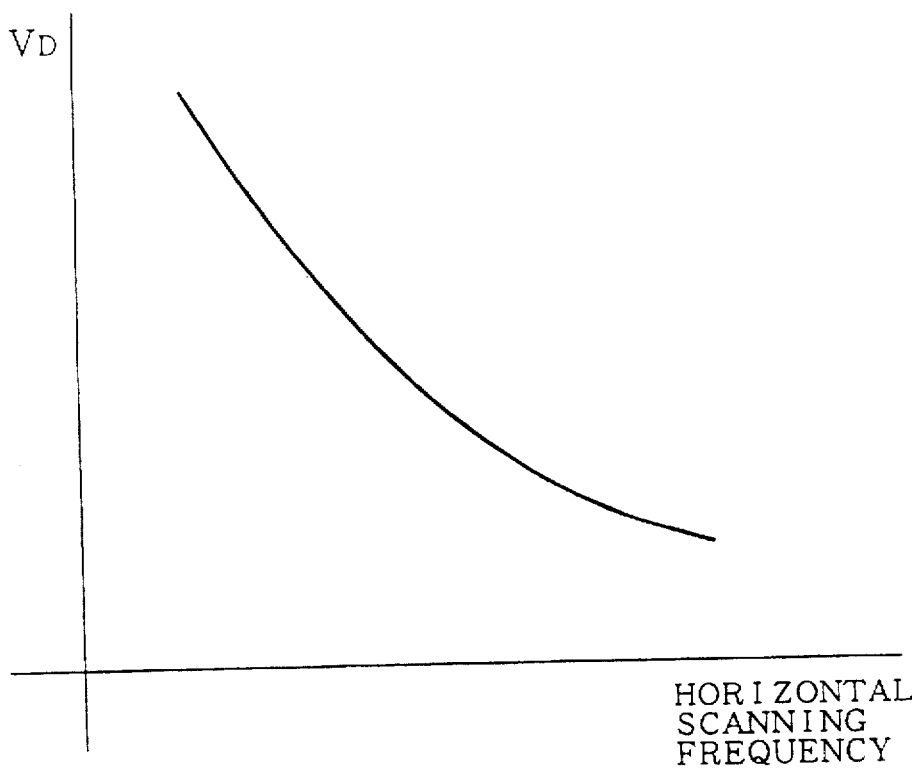
FIG. 3 is a graph showing a change of clipping levels set by the adjustable resistor of the parabolic-wave shaping circuit of FIG. 1(a)

Reference numeral 16 denotes a level-adjustable resistor as the clipping level manually adjusting means, and a variable resistor is employed as the level-adjustable resistor. The graduations showing horizontal scanning frequencies $f_H$ are marked around the resistor 16 as shown in the front view of FIG. 1(b). The adjustment for scanning at different horizontal scanning frequencies is made easy by utilizing this graduations. In FIG. 1(b), reference numeral 16a denotes a recess for rotating the sliding contact of the resistor 16. FIG. 3 shows an example of clipping levels $V_D$ thus set by the resistor 16 to the horizontal scanning frequencies. The graduations marked around the resistor 16 may be horizontal scanning periods.

Figure 2:
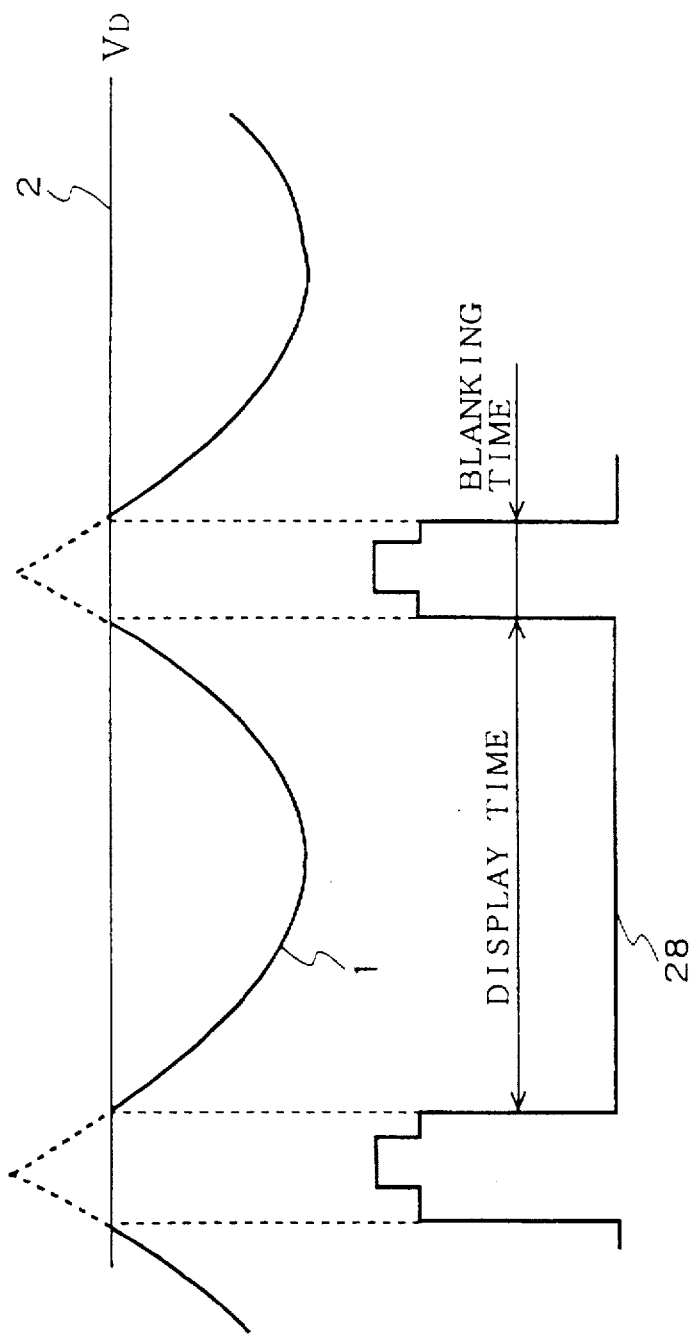
FIG. 2 is a timing chart showing a relationship between an output waveform of the parabolic-wave shaping circuit of FIG. 1(a) and a video signal.

Next, the operation thereof will be described. In FIG. 1(a), the parabolic-waveforms output from the amplifier 11 for outputting a parabolic-wave having a vertical scanning period and the amplifier 12 for outputting a parabolic-wave having a horizontal scanning period are added by the operational amplifier 13. In this case, a parabolic-waveform shown in FIG. 2 is output at point A of FIG. 1(a). That is to say, the peak of a parabolic-waveform output from the amplifier 12 is clipped, as shown in FIG. 2, by the clipping circuit comprising the capacitor 14, the diode 15, resistors R1, R2, and the level-adjustable resistor 16. The clipping level $V_D$ is expressed by the following formula (1):

$V_D=Vcc*(R2+\text{the resistance value on the } R2 \text{ side of the resistor } 16)/(R1+R2+\text{the resistance value of the resistor } 16)$  (1)

As apparent from the formula (1), the value of the clipping level $V_D$ can be adjusted by selecting the adjusted resister value of the resistor 16, and the parabolic-waveform can be adjusted so as to be clipped in accordance with the blanking time accordingly.

EMBODIMENT 2

Figure 4:
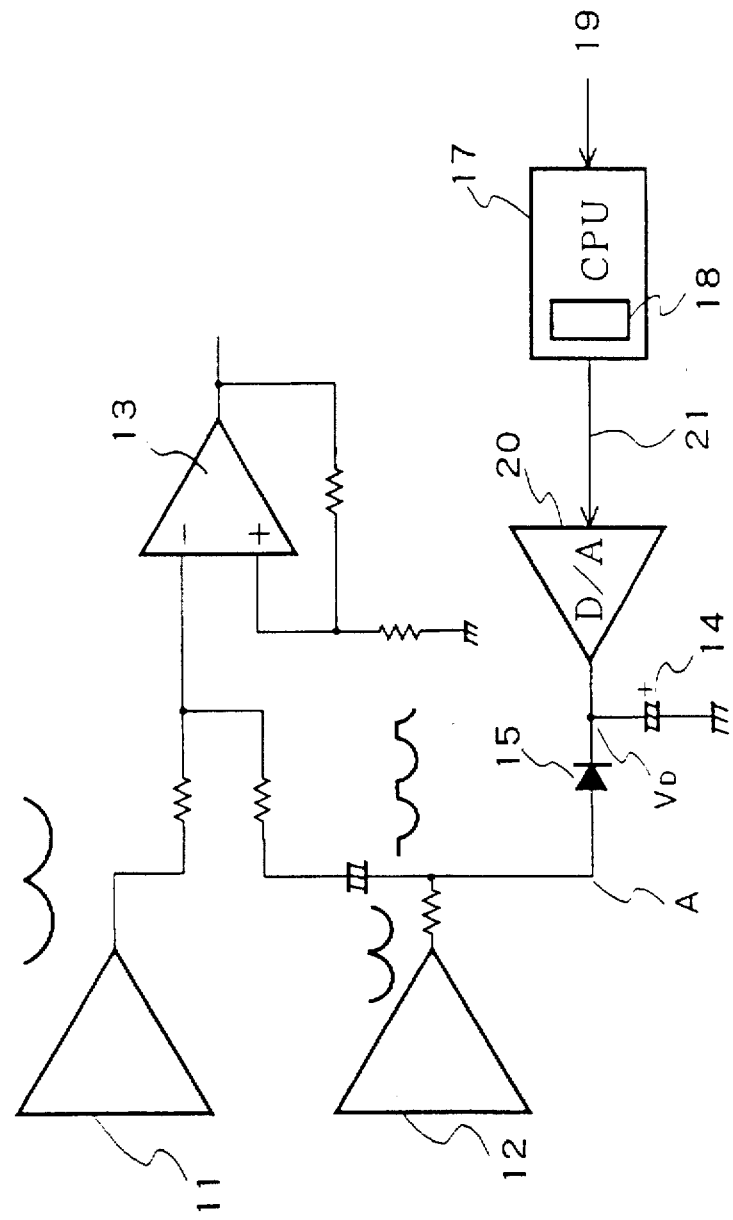
FIG. 4 is a circuit diagram showing the parabolic-wave shaping circuit for focus-correction of a second embodiment of the present invention (embodiment 2)
Figure 5:
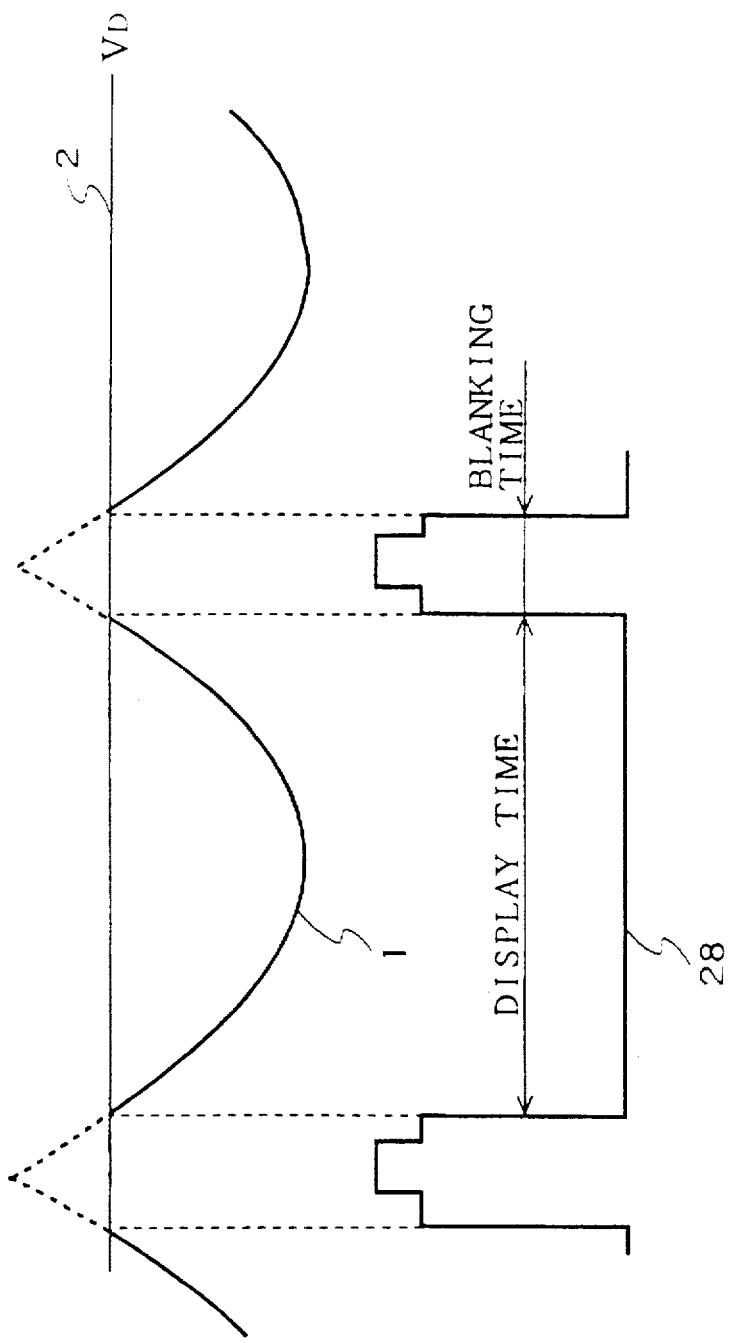
FIG. 5 is a timing chart showing a relationship between an output waveform of the circuit of FIG. 4 and a video signal.

Another embodiment of the present invention is shown in FIGS. 4 and 5. FIG. 4 is a circuit diagram showing the construction of the embodiment 2. In FIG. 4, reference numeral 20 denotes a D/A converter outputting a DC voltage level for clipping, and numeral 17 denotes a CPU for supplying signals to the D/A converter 17. Reference numeral 19 denotes the data of horizontal scanning frequencies or horizontal scanning periods which are transmitted from a personal computer connected to the CPU 17, and numeral 21 denotes data to be transmitted to the D/A converter 20. The parabolic-waveforms output from the amplifier 12 are clipped at the clipping level $V_D$ of the voltage output from the D/A converter 20. CPU 17 controls D/A converter 20 for controlling the clipping level $V_D$.

Since the horizontal scanning frequencies of a multiple scanning monitor to be connected to a personal computer, not shown, are various, the CPU 17 judges different blanking times to every personal computer to control the clipping level $V_D$ with the D/A converter 20. Data necessary for this control are memorized in the memory 18 in the CPU 17 in advance, and a characteristic of the data is shown in, for example, FIG. 3 of the embodiment 1.

The CPU 17, the memory 18 and the D/A converter 20 comprises the clipping level automatically adjusting means.

FIG. 5 shows a relationship between an adjusted parabolic voltage waveform and a video signal.

EMBODIMENT 3

Figure 6:
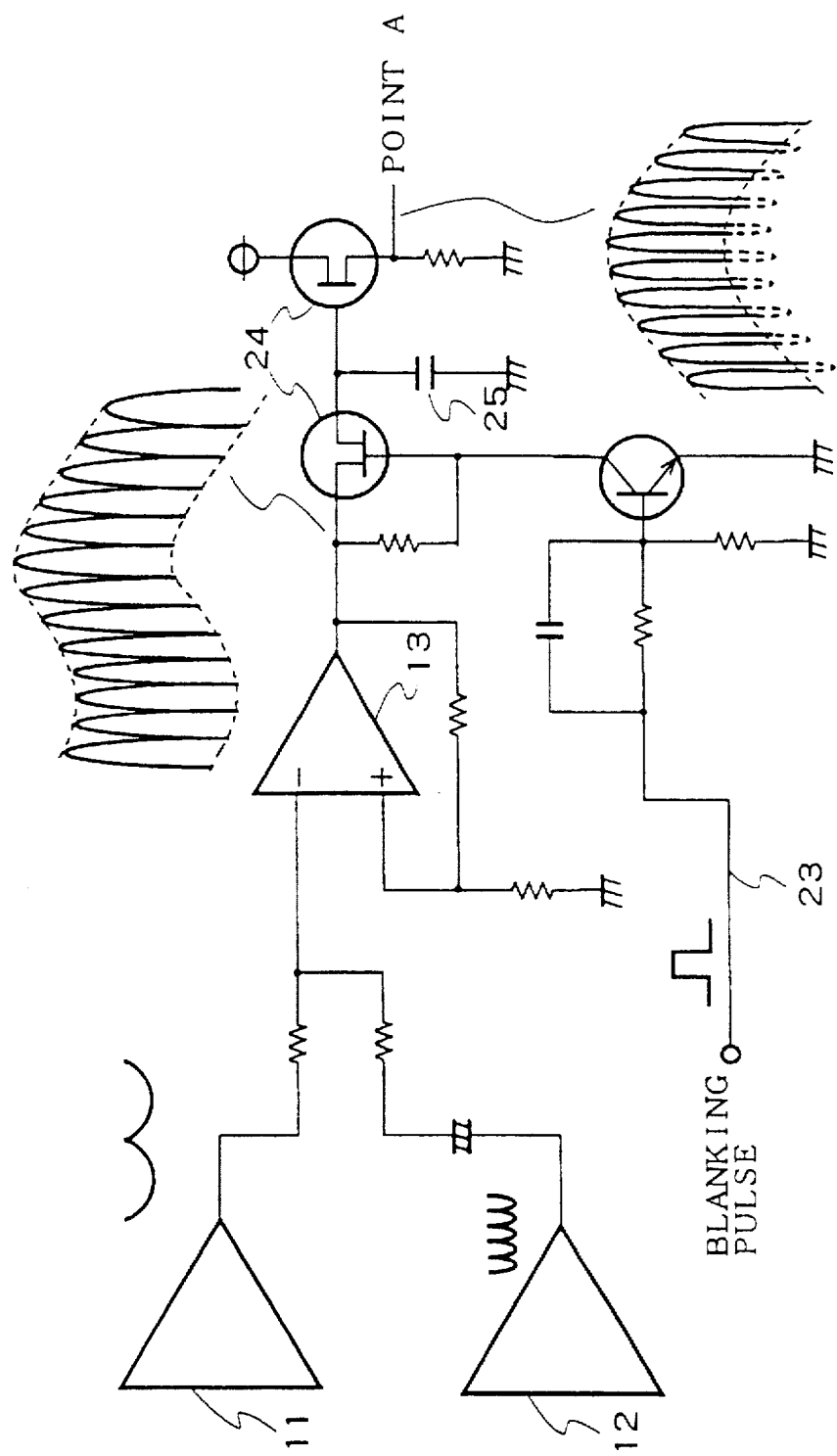
FIG. 6 is a circuit diagram showing the parabolic-wave shaping circuit for focus-correction of a third embodiment of the present invention (embodiment 3)
Figure 7:
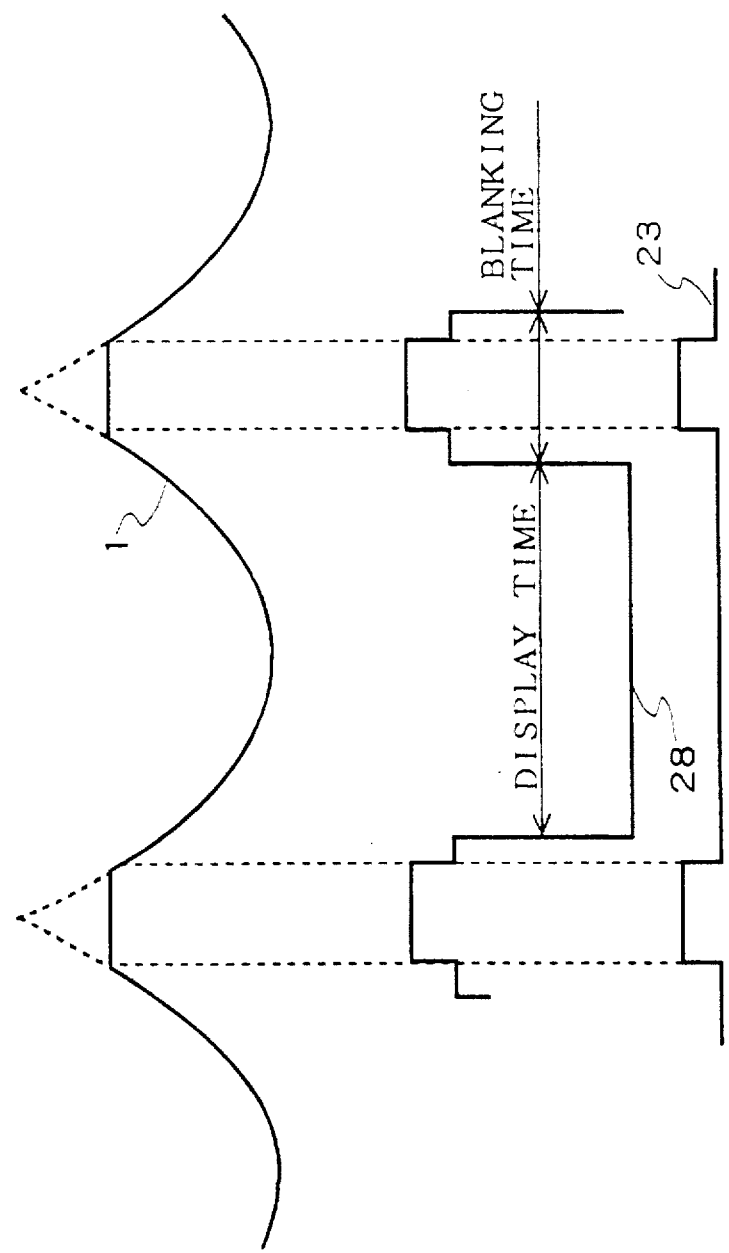
FIG. 7 is a timing chart showing a relationship between an output waveform of the circuit of FIG. 4 and a video signal.

FIG. 6 is a circuit diagram showing the construction of the embodiment 3, and FIG. 7 is a timing chart showing a relationship between an output waveform of the circuit shown in FIG. 7 and a video signal.

In FIG. 6, reference numeral 24 denotes field-effect transistors (FET's) composing a switching circuit; numeral 25 denotes a holding capacitor for holding a voltage level; and numeral 23 denotes a blanking pulse for erasing a fly-back line of the CRT to which the embodiment 3 is applied A holding circuit composed of the FET's 24 and a holding capacitor 25 holds the output of the operational amplifier for adding operation 13. The blanking pulse 23, which is used for erasing a fly-back line, is also used for determining the period of the holding. The peak of the parabolic voltage waveform 1 at the point A in FIG. 6 is thereby clipped as shown in FIG. 7; more strictly, the waveform 1 is clipped before it reaches to the peak value thereof.

Since the embodiment 3 clips output waveforms in accordance with the timings of them, not the levels of them, the embodiment attains an effect that the adjustment of levels becomes unnecessary. The holding circuit is inserted into the position of the circuit after vertical parabolic signals and horizontal parabolic signals are added, but the same effect can be obtained by inserting the holding circuit into a position where the horizontal parabolic signals are output.

EMBODIMENT 4

Figure 8:
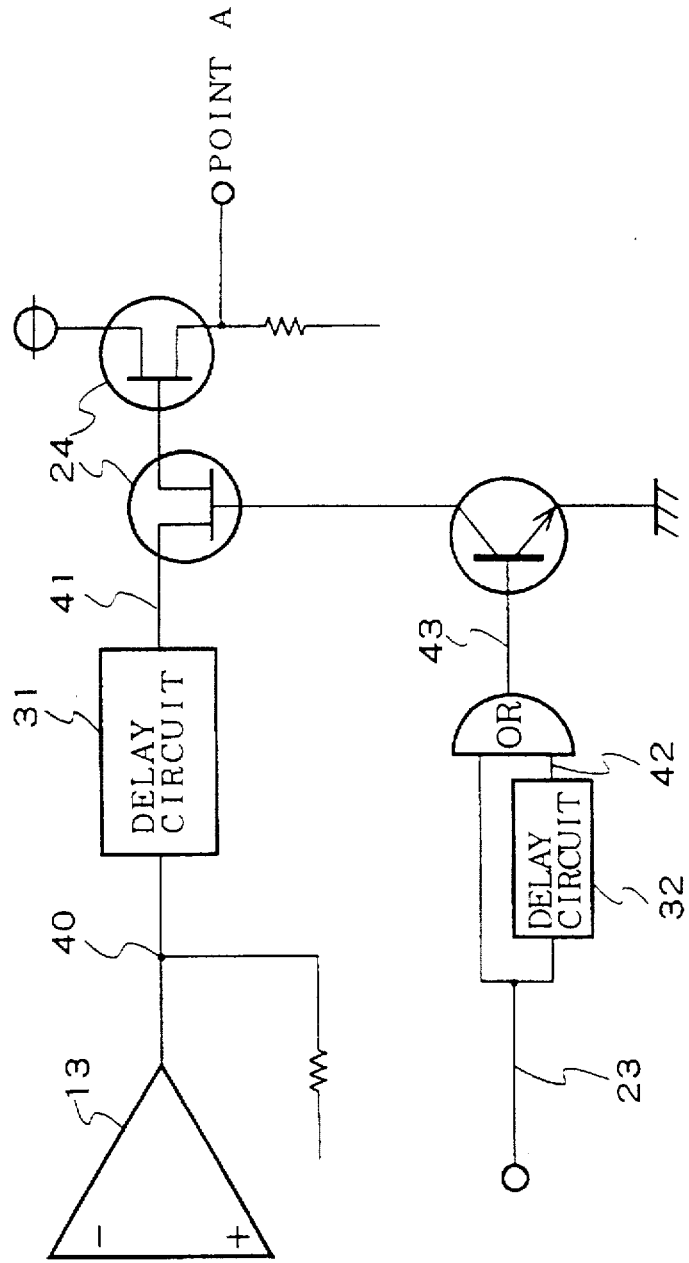
FIG. 8 is a circuit diagram showing the parabolic-wave shaping circuit for focus-correction of a fourth embodiment of the present invention (embodiment 4)

The length of time when the blanking pulse is being output and the length of time when the parabolic-waveform is being clipped is perfectly the same in the circuit of FIG. 6, but the length of time when the parabolic-waveform may be being clipped is slightly longer than the length of time of the blanking pulse 23, because the length of time of blanking is a little longer than the length of time of the blanking pulse 23 as shown in FIG. 7. Accordingly, the effect of clipping would become larger by making the length of time when the parabolic-waveform is clipped longer than the length of time of the blanking pulse 23. Therefore, for example, appropriate delay circuits, are used on both the sides of the parabolic-waveform and the blanking pulse. FIG. 8 shows an embodiment thus constructed. In FIG. 8, reference numeral 31 denotes a delay circuit having a time-delay $t_{31}$, and numeral 32 denotes a delay circuit having a time-delay $t_{32}$.

Figure 9:
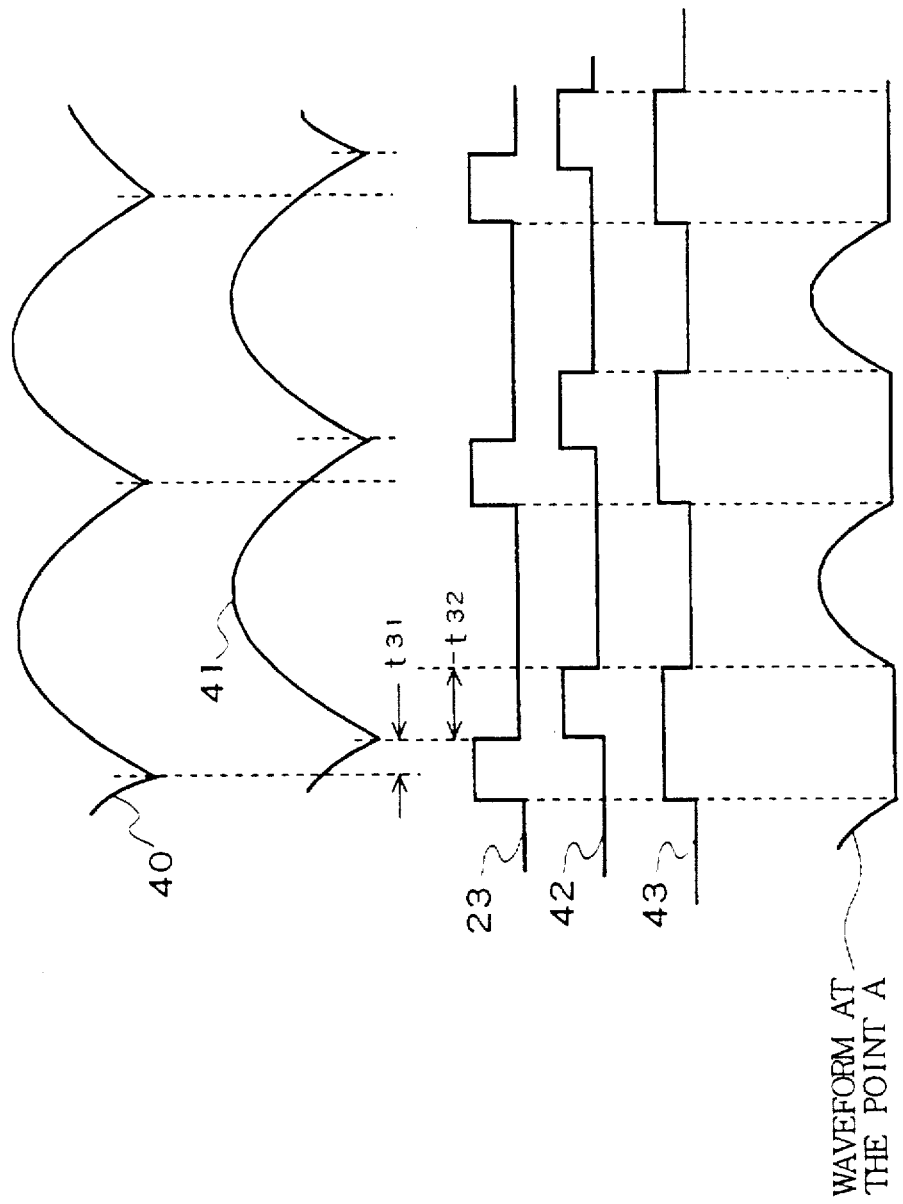
FIG. 9 is a timing chart showing the operation of the circuit of FIG. 8.
Figure 10:
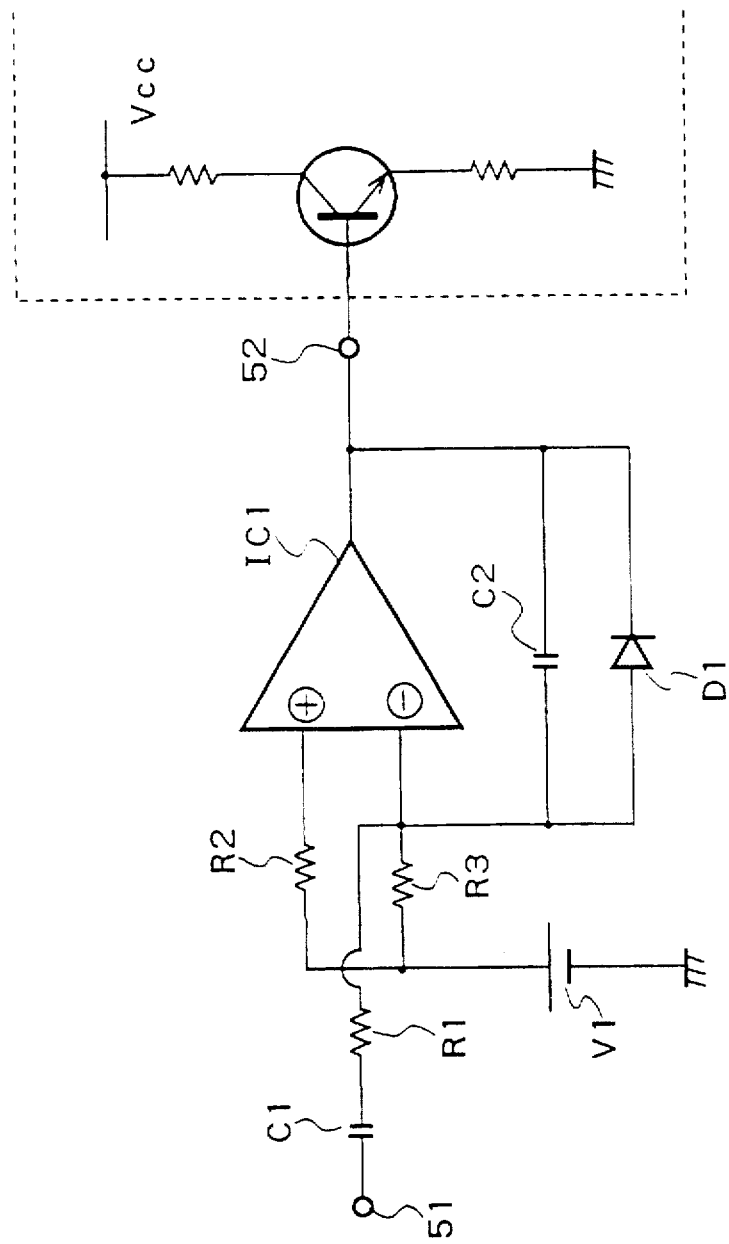
FIG. 10 is a circuit diagram showing a conventional focus-correcting circuit.
Figure 11:
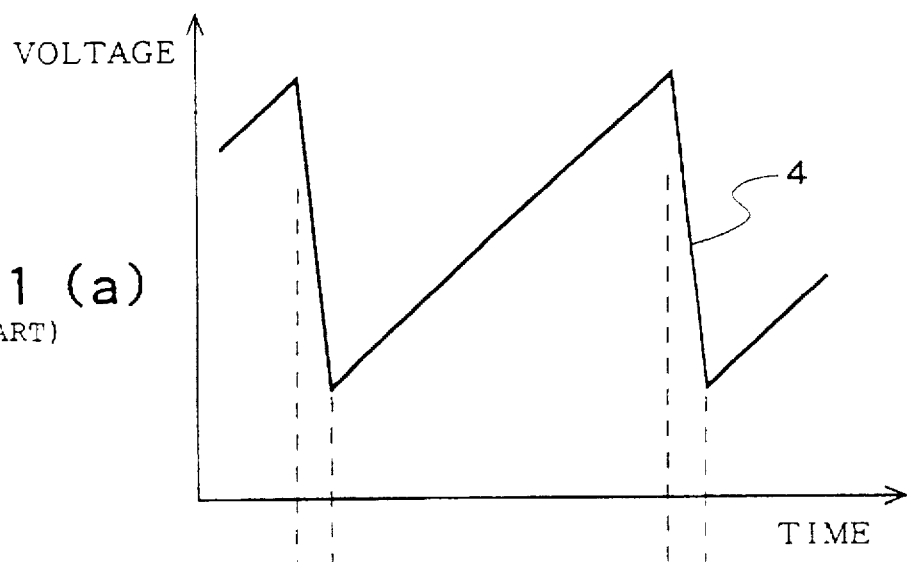
FIG. 11(a) and FIG. 11(b) are waveform views showing an input waveform and an output waveform of the circuit of FIG. 10 respectively.
Figure 11:
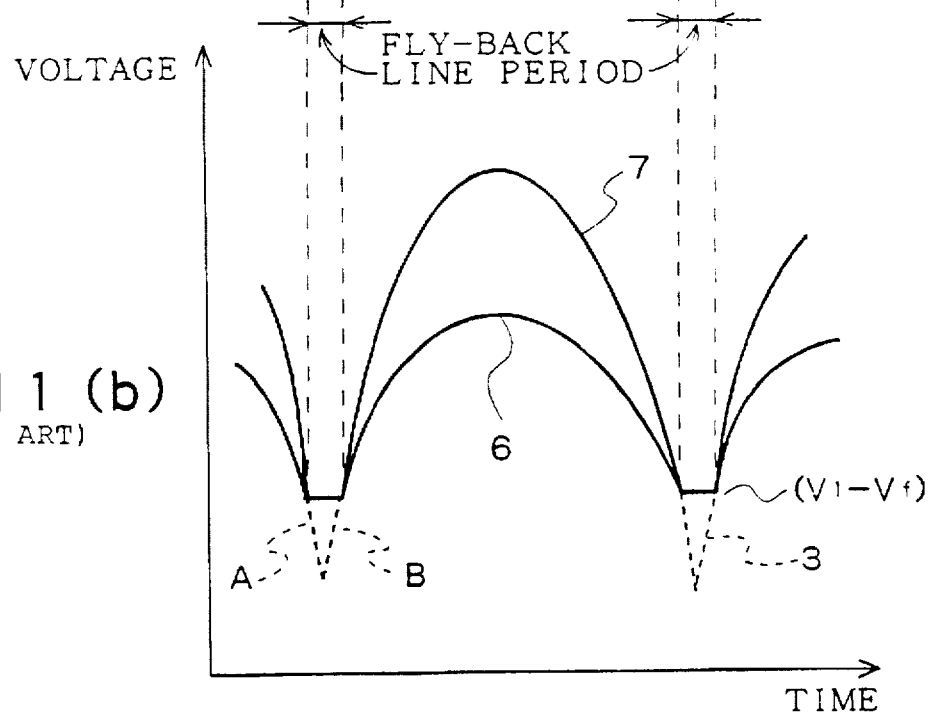
Figure 12:
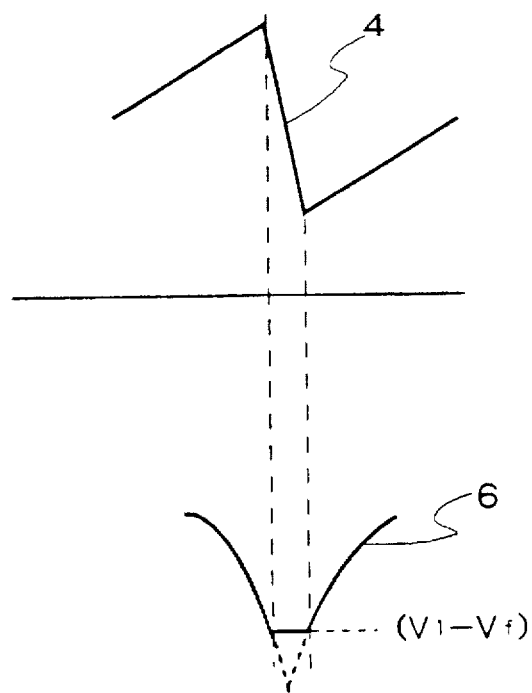
FIG. 12(a) and FIG. 12(b) are waveform views showing waveforms for illustrating the characteristic of the circuit of FIG. 10.
Figure 12:
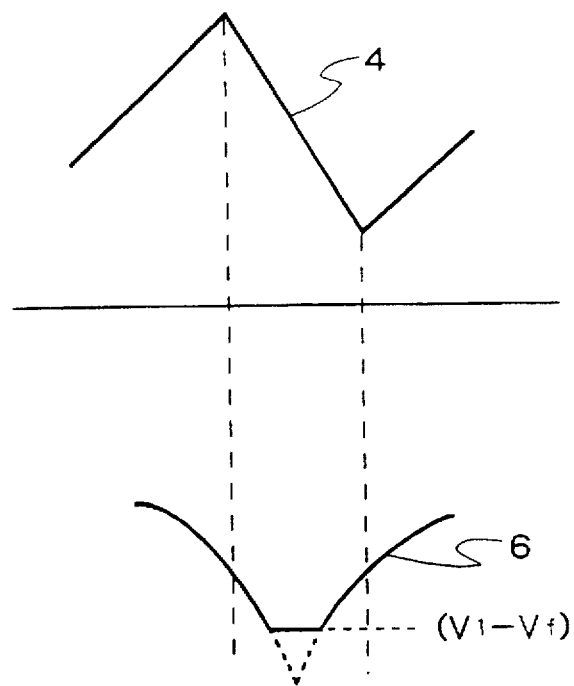

FIG. 9 is a timing-chart for describing the operation of the circuit of FIG. 8. Reference numerals 40, 41, 42 and 43 denote the points of the circuit where the waveforms to be described exist.

By delaying the parabolic-waveform at the point 40 by the time corresponding to the time-delay $t_{31}$ by the delay circuit 31, the blanking pulse 23 looks to have moved forward by the time corresponding to the time-delay $t_{31}$ on the appearance thereof.

Moreover, the blanking pulse 23 is delayed by the delay circuit 32 by the time corresponding to the time-delay $t_{32}$ to be a signal at the point 42. The delayed signal at the point 42 and the original not delayed signal 23 are added by an OR circuit to generate a signal at the point 43, which is the elongated blanking pulse 23 by the length of time corresponding to the time-delay $t_{32}$.

The length of time of the signal at the point 43 for holding the waveform at the point 41 is elongated to the original length of time of the blanking pulse 23 for holding the original waveform at the point 40 apparently to the forward and the backward. A parabolic-waveform thus output is shown in FIG. 9 as the waveform at the point A.

It will be appreciated from the foregoing description that, according to the present invention, the adjustment of parabolic-wave shaping circuit for focus-correction can be done accurately and rapidly in a factory, because the circuit outputs parabolic-waveform for the period of time necessary for focus-correction.

The invention also can keep influence on static focus electrodes little.

The invention further can lower the power supply voltage necessary for outputting parabolic-waveforms, because the amplitudes of the parabolic-waveforms are small.

According to the first aspect of the invention, the aforementioned effects can be obtained by clipping the parabolic-waveforms at an arbitrary level.

Furthermore, according to the second aspect of the invention, the aforementioned effects can be obtained only by adjusting the sliding contact to the graduations showing horizontal scanning frequencies or horizontal scanning periods.

Furthermore, according to the third aspect of the present invention, the aforementioned effects can be obtained without especially adjusting levels manually.

Furthermore, according to the fourth aspect of the invention, the aforementioned effects can be obtained without especially adjusting levels, because parabolic-wave outputs are held in accordance with the timings of blanking pulses.

Furthermore, according to the fifth aspect of the present invention, the further stabilized operation of the circuit can be obtained in addition to the effects brought about by the fourth aspect, because the output levels of the parabolic-waves before blanking pulses are output are held.

Furthermore, according to the sixth aspect of the present invention, the further stabilized operation of the circuit can be obtained in addition to the effects brought about by the fourth aspect, because the output levels of the parabolic-waves are held for the periods of time ranging before and after blanking pulses.

While preferred embodiments of the present invention have been described by the use of specific terms, such description is for illustrative purposes only, and it is to be understood that changes and variations may be made without departing from the spirit or scope of the following claims.

What is claimed is:

1. A focus correcting circuit for a cathode-ray tube (CRT) display having vertical and horizontal scanning periods, comprising:
   a first amplifier for outputting a first parabolic wave with a vertical scanning period;
   a second amplifier for outputting a second parabolic wave with a horizontal scanning period;
   a parabolic-wave outputting circuit for outputting a combined signal of said first and second parabolic waves as output waves; and
   a parabolic wave shaping circuit for shaping said output wave including said first and second parabolic waves having vertical and horizontal scanning periods, said parabolic wave shaping circuit further comprising:
      a holding circuit for receiving a blanking pulse used to clip a portion of said output wave corresponding to a flyback period in said CRT.

2. The focus correcting circuit of claim 1, wherein said holding circuit includes a first delay circuit for delaying the output of said parabolic wave outputting circuit before said portion of said output is clipped.

3. The focus correcting circuit of claim 1, wherein said holding circuit includes a first delay circuit for delaying the output of said parabolic-wave outputting circuit and a second delay circuit for extending a period of said blanking pulse, such that a length of time when said output wave is clipped is longer than said blanking pulse.

4. A focus correcting circuit for a cathode-ray tube (CRT) display having vertical and horizontal scanning periods, comprising:
   a parabolic-wave generating circuit for generating a parabolic wave which is a combination of a first parabolic wave with a vertical scanning period and a second parabolic wave with a horizontal scanning period;
   a parabolic-wave outputting circuit for outputting a combined signal of said first and second parabolic waves as output waves; and
   a parabolic wave shaping circuit for shaping said output wave including said first and second parabolic waves having vertical and horizontal scanning periods, said parabolic wave shaping circuit further comprising:
      a holding circuit for receiving a blanking pulse used to clip a portion of said output wave corresponding to a flyback period in said CRT.

5. The focus correcting circuit of claim 4, wherein said holding circuit includes a first delay circuit for delaying the output of said parabolic wave outputting circuit before said portion of said output is clipped.

6. The focus correcting circuit of claim 4, wherein said holding circuit includes a first delay circuit for delaying the output of said parabolic-wave outputting circuit and a second delay circuit for extending a period of said blanking pulse, such that a length of time when said output wave is clipped is longer than said blanking pulse.

* * * * *